(12) United States Patent
Sako et al.

(10) Patent No.: US 7,142,494 B2
(45) Date of Patent: Nov. 28, 2006

(54) CONTENT DATA ENCRYPTION METHODOLOGY, MEDIUM AND APPARATUS FOR RECORDING/REPRODUCING CONTENT

(75) Inventors: Yoichiro Sako, Tokyo (JP); Tatsuya Inokuchi, Tokyo (JP); Shunsuke Furukawa, Tokyo (JP)

(73) Assignee: Sony Corporation, Tokyo (JP)

(*) Notice: Subject to any disclaimer, the term of this patent is extended or adjusted under 35 U.S.C. 154(b) by 166 days.

(21) Appl. No.: 10/250,307

(22) PCT Filed: Oct. 22, 2002

(86) PCT No.: PCT/JP02/10929

§ 371 (c)(1),
(2), (4) Date: Jun. 30, 2003

(87) PCT Pub. No.: WO03/038821

PCT Pub. Date: May 8, 2003

(65) Prior Publication Data

US 2004/0133791 A1 Jul. 8, 2004

(30) Foreign Application Priority Data

Oct. 31, 2001 (JP) .............................. 2001-334306

(51) Int. Cl.
*G11B 7/00* (2006.01)

(52) U.S. Cl. ................................... 369/53.21

(58) Field of Classification Search ............. 369/53.21, 369/275.3, 47.12, 47.13, 59.25
See application file for complete search history.

(56) References Cited

U.S. PATENT DOCUMENTS

| | | | |
|---|---|---|---|
| 6,289,102 B1 * | 9/2001 | Ueda et al. ................. 380/201 |
| 6,351,538 B1 * | 2/2002 | Uz ............................. 380/201 |
| 6,526,010 B1 * | 2/2003 | Morioka et al. ......... 369/47.15 |
| 6,580,683 B1 * | 6/2003 | Braitberg et al. ........ 369/275.3 |
| 6,587,948 B1 * | 7/2003 | Inazawa et al. ............. 713/193 |
| 6,628,591 B1 * | 9/2003 | Yokota et al. ........... 369/53.21 |
| 6,687,826 B1 * | 2/2004 | Owa .......................... 713/193 |
| 6,993,135 B1 * | 1/2006 | Ishibashi .................... 380/277 |
| 2001/0036132 A1 * | 11/2001 | Kobayashi et al. ........... 369/13 |
| 2002/0048365 A1 * | 4/2002 | Namiki et al. .............. 380/201 |

FOREIGN PATENT DOCUMENTS

| | | |
|---|---|---|
| JP | 7-169187 | 7/1995 |
| JP | 7-249264 | 9/1995 |
| JP | 9-115241 | 5/1997 |
| JP | 9-326166 | 12/1997 |

* cited by examiner

*Primary Examiner*—Wayne Young
*Assistant Examiner*—Lixi Chow
(74) *Attorney, Agent, or Firm*—Oblon, Spivak, McClelland, Maier & Neustadt, P.C.

(57) ABSTRACT

The present invention is a recording medium comprising a lead-in area, a data record area for recording encrypted content data, and a lead-out area, wherein key information for decrypting the encrypted content data is recorded in at least one of the lead-in area and the lead-out area and the program area.

14 Claims, 8 Drawing Sheets

CONTENT DATA ENCRYPTION METHODOLOGY, MEDIUM AND APPARATUS FOR RECORDING/REPRODUCING CONTENT

TECHNICAL FIELD

The present invention relates to a recording medium, a recording medium recording method and apparatus, and a recording medium reproducing method and apparatus which allow content data to be secured with encryption, in particular, to those which allow a conventional apparatus which cannot deal with a new type optical disc on which encrypted content data is recorded to decrypt the encrypted content data.

BACKGROUND ART

A new type optical disc whose data can be reproduced by a conventional CD-DA (Compact Disc Digital Audio) player and a CD-ROM (Compact Disc Read Only Memory) disc drive device and which is congenial with a computer has been developed. On the new type optical disc, content data is encrypted and recorded so as to protect copyright thereof. When content data is encrypted and recorded on the new type optical disc, key information for the content data is considered to be recorded in a lead-in area of the optical disc.

In other words, when content data is encrypted and recorded, it is necessary to consider a location at which the key information is stored. To securely manage the key information, it is advantageous to store the key information at a location which the user cannot easily access. Thus, when video data is recorded on for example a DVD (Digital Versatile Disc), key information is recorded in a lead-in area thereof and data encrypted with the key information is stored in a program area thereof. Likewise, for the new type optical disc, it is considered that key information should be recorded in a lead-in area thereof so that the user cannot easily access the key information.

When the DVD was designed, content data was considered to be encrypted so as to protect copyright thereof. Thus, when key information is recorded in the lead-in area, no problem takes place. However, if key information is recorded in the lead-in area of the new type optical disc, the conventional disc player and disc drive device which cannot deal with the new type optical disc will not be able to reproduce content data therefrom.

In other words, when the conventional CD-DA disc and CD-ROM disc were designed, content data was not considered to be encrypted. Thus, they do not have a function for decrypting encrypted content data. When the conventional disc player and disc drive device which cannot deal with the new type optical disc decrypt encrypted content data from the new type optical disc, a software process will be considered to perform a decrypting process for the content data.

However, while the conventional disc player and disc drive device are reproducing content data, the software does not allow them to access a lead-in area. In other words, corresponding to the CD-ROM standard, the CD-ROM is accessed in the unit of a sector which is composed of 98 frames. While the conventional disc player and disc drive device are reproducing content data from the CD-ROM, they access each sector, not the lead-in area of the CD-ROM. Thus, when key information has been recorded in the lead-in area, the conventional disc player and disc drive device which cannot deal with the new type optical disc cannot access the key information and thereby decrypt content data.

Of course, the disc player and disc drive device which can deal with the new type optical disc of which key information is recorded in the lead-in area will be designed to obtain the key information therefrom, and decrypt encrypted content data with the obtained key information. Thus, when the disc player and disc drive device have been widely used, the forgoing problem of which key information cannot be accessed from the lead-in area and content data cannot be reproduced will be solved.

However, in a transitional period until the disc player and disc drive device which can deal with the new type optical disc become common, the conventional disc player and disc drive device which cannot deal with the new type optical disc try to decrypt encrypted content data of the new type optical disc. Thus, since the conventional disc player and disc drive device cannot access key information of the lead-in area, they cannot decrypt the encrypted content data.

Therefore, an object of the present invention is to provide a recording medium and a recording medium recording method and apparatus which allow the conventional reproducing apparatus which cannot deal with encrypted content data to decrypt it.

Another object of the present invention is to provide a recording medium reproducing method and apparatus which allows the conventional apparatus which cannot deal with encrypted content data and an apparatus which can deal with encrypted content data to decrypt encrypted content data recorded on a recording medium.

DISCLOSURE OF THE INVENTION

The present invention is a recording medium comprising a lead-in area; a data record area for recording encrypted content data; and a lead-out area, wherein key information for decrypting the encrypted content data is recorded in at least one of the lead-in area and the lead-out area and the program area.

The present invention is a recording medium recording method, comprising the steps of encrypting content data with key information; recording the encrypted content data to a data record area of a recording medium which has at least a lead-in area and a lead-out area along-with the data record area; and recording the key information to at least one of the lead-in area and the lead-out area and the program area.

The present invention is a recording medium recording apparatus, comprising a head portion for scanning a recording medium having at least a lead-in area, a data record area, and a lead-out area; an encrypting circuit for encrypting content data with key information; a signal processing circuit portion for performing a record signal process for output data of the encrypting circuit and supplying the resultant processed signal to the head portion; and a controlling portion for recording the encrypted content data to the data record area of the recording medium and recording the key information to at least one of the lead-in area and the lead-out area and the program area.

The present invention is a recording medium reproducing method, comprising the steps of providing a recording medium having at least a lead-in area, a data record area for recording encrypted content data, and a lead-out area; starting a reproducing operation corresponding to program data for reproducing the encrypted content data recorded in the data area of the recording medium, key information for decrypting the encrypted content data being recorded in at least one of the lead-in area and the lead-out area and the program area; reading the key information recorded in the data record area; reading the encrypted content data recorded in the data record area; and decrypting the encrypted content data which has been read with the key information which has been read.

The present invention is a recording medium reproducing method, comprising the steps of providing at least a lead-in area, a data record area for recording encrypted content data, and a lead-out area; reading key information for decrypting the encrypted content data from the lead-in area, the key information having been recorded in at least one of the lead-in area and the data record area and the program area; and decrypting the encrypted content data which has been read from the data area with the key information which has been read.

The present invention is a recording medium reproducing apparatus, comprising a recording medium having at least a lead-in area, a data recode area for recording encrypted content data, and a lead-out area; a head portion for scanning the recording medium, key information for decrypting the encrypted content data having been recoded in at least one of the lead-in area and the lead-out area and the program area; a signal processing circuit portion for performing a reproduction signal process for data which has been read from the head portion; and a decrypting circuit portion for decrypting the encrypted content data which has been read from the data area with the key information which has been read from the recording medium.

Content data has been encrypted and recorded in the program area. Key information for the content data has been recorded in both the lead-in area and the program area. Thus, the disc player and disc drive device which can deal with the new type optical disc can unconditionally access the key information of the lead-in area and decrypt the encrypted content data of the program area. In addition, the disc player and disc drive device which cannot deal with the new type optical disc allows the software process to access the key information of the program area and decrypt the content data of the program area.

BEST MODES FOR CARRYING OUT THE INVENTION

Next, with reference to the accompanying drawings, an embodiment of the present invention will be described. According to the embodiment, as a recording medium, a new type optical disc is used. The new type optical disc is almost the same as a CD disc in physical standards such as size. A conventional disc drive device can optically read information from the new type optical disc.

Encrypted content data has been recorded on the new type optical disc according to the present invention. Encrypted content data is for example CD-ROM formatted or CD-DA formatted content data of audio, picture, or the like which has been encrypted. The encrypting method is for example DES (Data Encryption Standard). When necessary, content data has been compressed and encoded corresponding to ATRAC3 (Adaptive TRansform Acoustic Coding 3), MP3 (MPEG1 Audio Layer-3), AAC (MPEG2 Advanced Audio Coding), or TwinVQ.

Figure 1A:
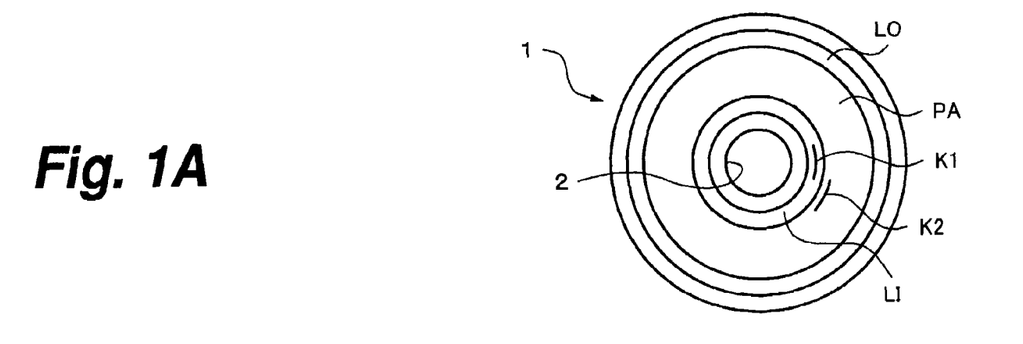
FIG. 1A, FIG. 1B, and FIG. 1C are schematic diagrams for explaining an example of an optical disc according to the present invention.

As shown in FIG. 1A, the diameter of an optical disc 1 as the new type optical disc according to the present invention is 120 mm. The optical disc 1 has a hole 2 at the center. The optical disc 1 may be an optical disc having the same physical shape as an optical disc which is so-called CD single.

The optical disc 1 may be a reproduction-only disc, a write-once type disc; or a rewritable disc.

In the reproduction-only optical disc 1, as the material of a recording layer, aluminum is used. In the reproduction-only optical disc 1, data is recorded as a physical concave and convex pattern, so-called pits. Normally, a disc substrate is produced by an injection molding method using a stamper. On the pit-formed plane of the disc substrate, a recording layer composed of aluminum, namely a reflection film, is coated.

In the write-once type optical disc 1, as a recording layer coated on a disc substrate, an organic coloring matter such as phthalocyanine or cyanine is used. In the write-once type optical disc, when data is written, the temperature of the organic coloring matter on the disc is raised with laser. As a result, the organic coloring matter is thermally deformed.

In the rewritable optical disc 1, as a recording layer coated on a disc substrate, a phase change material is used. An example of phase change material is an alloy of Ag—In—Sb—Te (silver-indium-antimony-tellurium). Such a phase change material has a crystal phase and an amorphous phase. When the intensity of light beam is strong, the phase change recording film is heated to a temperature exceeding the melting point and then quickly cooled. As a result, the phase change recording film becomes an amorphous state. In contrast, when the intensity of the optical beam is relatively weak, the phase change recording film is heated to around the crystallization temperature and then gradually cooled. As a result, the phase change recording film becomes a crystallization state. Using such characteristics of the phase change recording layer, data is recorded and rewritten.

Figure 1B:
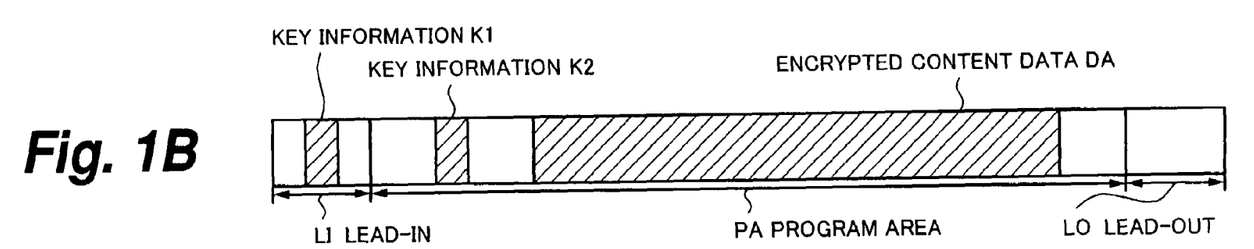

As shown in FIG. 1A, in an inner circular area of the optical disc 1, a lead-in area LI is formed. Outside the lead-in area LI, a program area PA is formed. Outside the program area PA, a lead-out area LO is formed. As shown in FIG. 1B, in the program area PA, encrypted content data DA has been recorded. Content data is for example audio data which has been compressed corresponding to the forgoing ATRAC3 system. The encrypting method is for example DES. Of course, content data is not limited to audio data. The compressing system is not limited to the ATRAC3 system. Likewise, the encrypting system is not limited to the DES system.

As shown in FIG. 1B, key information K1 for decrypting encrypted content data DA of the program area PA has been recorded in the lead-in area LI so as to prevent key information from being easily accessed. To improve the security of the key information K1, it is protected with a hidden key.

To consider the case that the optical disc 1 is used on the conventional disc player and disc drive device which cannot deal with the optical disc 1, key information K2 which is same as the key information K1 is recorded in the program area PA. Likewise, to improve the security of the key information K2, it is also protected with a hidden key.

When the disc player and disc drive device which can deal with the optical disc 1 is designed, they will be considered to access the lead-in area LI and obtain key information therefrom. Thus, by unconditionally accessing the key information K1 of the lead-in area LI of the optical disc 1, they can perform a decrypting process for the encrypted content data DA recorded in the program area PA. The disc player and disc drive device which can deal with the optical disc 1 will be provided with hardware or software for performing the decrypting process for encrypted content data.

On the other hand, the conventional disc player and disc drive device which cannot deal with the optical disc 1 is not provided with hardware or software for performing the decrypting process for encrypted content data. They may perform the decrypting process for encrypted content data as a software process. In this case, since they access the content data in the unit of a sector, they cannot access the key information K1 of the lead-in area LI of the optical disc 1.

According to the embodiment, as shown in FIG. 1B, in addition to the key information K1 recorded in the lead-in area LI, the same key information K2 is recorded in the program area PA. When the key information K2 has been recorded in the program area PA, the software process allows the key information K2 to be accessed and the content data DA of the program area PA to be decrypted with the key information K2.

Figure 1C:
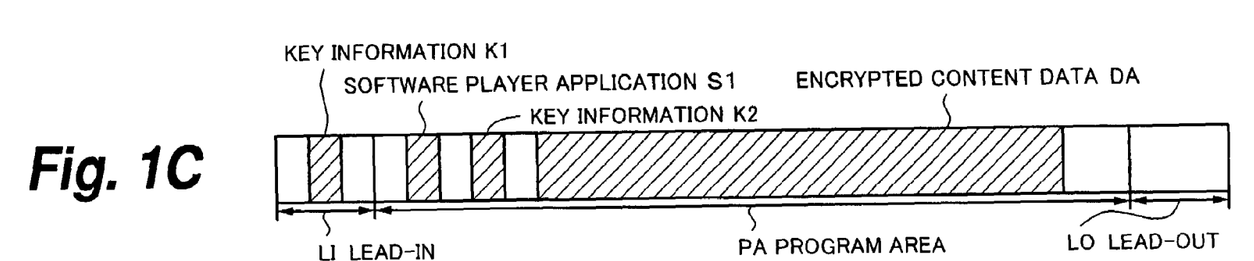

In addition, as shown in FIG. 1C, a software player application S1 which is a decrypting process program for decrypting the encrypted content data DA recorded in the program area PA may have been recorded in the program area PA. As shown in FIG. 1C, when the software player application S1 which has been recorded is started, the key information K2 of the program area PA is accessed. With the key information K2, the encrypted content data DA is decrypted. When the location of the key information K2 is not obtained unless the software player application S1 has been started, since the key information K2 is prevented from being easily access, the security of the key information K2 is improved.

As shown in FIG. 1A to FIG. 1C, when the optical disc 1 of which the key information K1 and K2 have been recorded in the lead-in area LI and the program area PA, respectively is used, the disc player and disc drive device which can deal with the optical disc 1 can unconditionally access the key information K1 of the lead-in area LI and decrypt the encrypted content data DA of the program area PA with the key information K1. On the other hand, the conventional disc player and disc drive device which cannot deal with the optical disc 1 can access the key information K2 of the program area PA and decrypt the encrypted content data DA of the program area PA with the key information K2 using the software process. Thus, according to the embodiment of the present invention, any of the disc player and disc drive device which can deal with the optical disc 1 and the conventional disc player and disc drive device which cannot deal with the optical disc 1 can decrypt encrypted content data. In particular, in a transitional period until the disc player and disc drive device which can deal with the optical disc 1 become common, the present invention is very useful.

In the forgoing example, although key information has been recorded in both the lead-in area LI and the program area PA, key information may have been recorded in both the lead-out area LO and the program area PA. Alternatively, key information may have been recorded in all the lead-in area LI, the lead-out area LO, and the program area PA.

In FIG. 1B, the key information K2 of the program area PA is disposed inside (on an inner circular area side) of the encrypted content data DA. Alternatively, the key information K2 may have been recorded at any location of the program area PA. Likewise, the software player application S1 shown in FIG. 1C may have been recorded at any location of the program area PA. When the software player is started and encrypted content data is decrypted thereby, it is preferred that the software player application S1 should be recorded at the beginning of the program area PA.

Figure 2A:
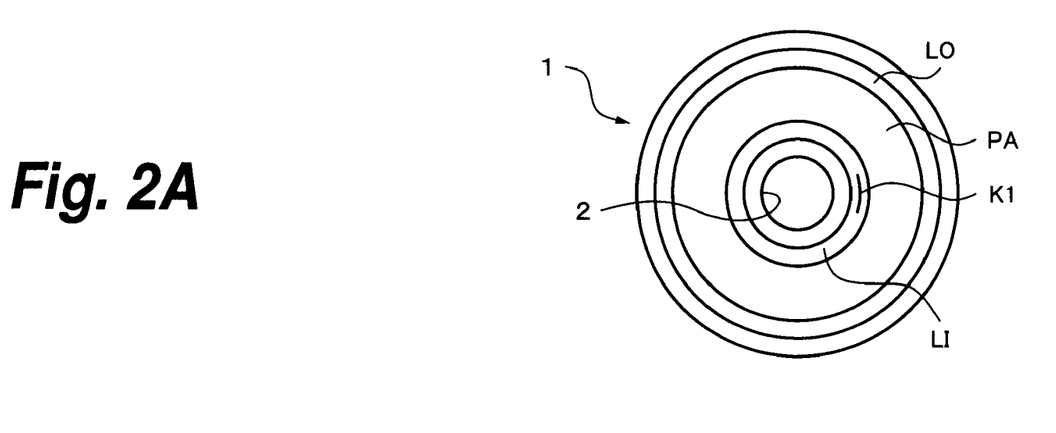
FIG. 2A and FIG. 2B are schematic diagrams for explaining an example of a new type optical disc.
Figure 2B:
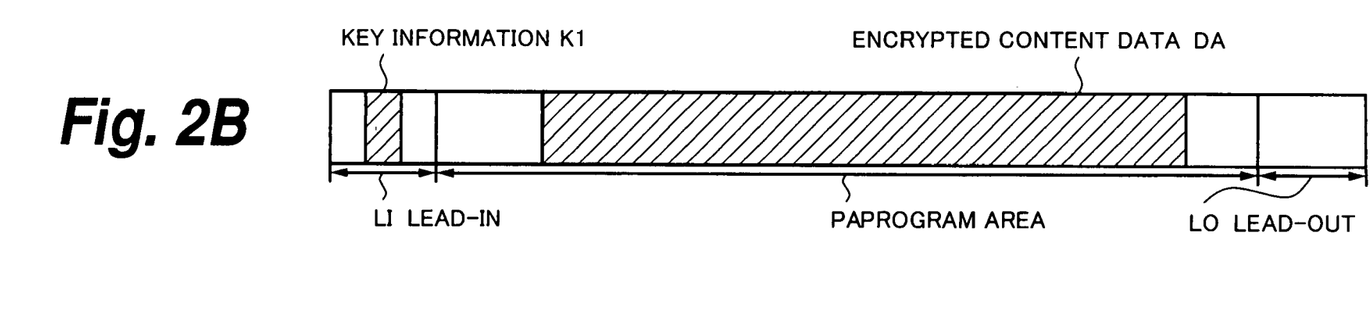

When the disc player and disc drive device which can deal with the optical disc 1 will have become common, the key information K2 of the program area PA will be considered to be unnecessary. At that point, as shown in FIG. 2A and FIG. 2B, the key information K1 may have been recorded in only the lead-in area LI.

Figure 3:
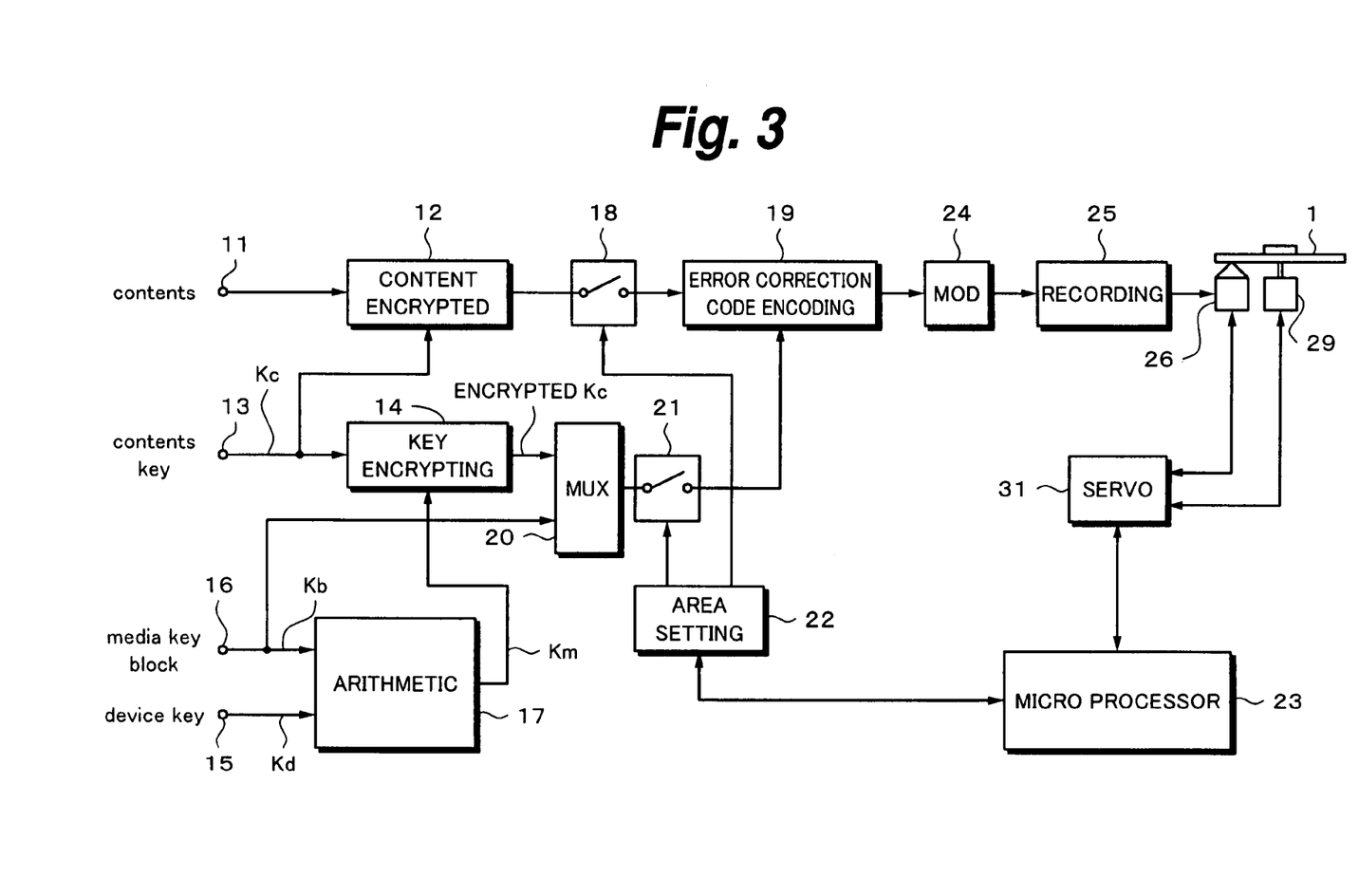
FIG. 3 is a block diagram showing an example of an optical disc recording apparatus according to the present invention.

FIG. 3 shows an example of a recording apparatus according to the present invention. As shown in FIG. 1, the recording apparatus records the encrypted content data DA in the program area PA and the key information K1 and K2 in the lead-in area LI and the program area PA, respectively.

In FIG. 3, content data is supplied to an input terminal 11. The content data is audio data which has been compressed corresponding to for example the ATRAC3 system. Of course, as content data, PCM audio data or audio data which has been compressed corresponding to another system such as MP3, AAC, or TwinVQ may be input. In addition, content data may be still picture data or vide data other than audio data.

The content data which has been input from the input terminal 11 is supplied to a content encrypting circuit 12. Data regarding a content key Kc is supplied from an input terminal 13 to the content encrypting circuit 12. The content encrypting circuit 12 encrypts the content data which has been input from the input terminal 11 with the content key Kc supplied from the input terminal 13.

The encrypting system used in the content encrypting circuit 12 is for example DES. Of course, besides the DES system, another encrypting system may be used.

Encrypted content data which is output from the content encrypting circuit 12 is supplied to an error correction code encoding circuit 19 through a switch circuit 18. The switch circuit 18 is controlled with an output signal of an area setting circuit 22.

The data regarding the content key Kc which is input from the input terminal 13 is supplied to a key encrypting circuit 14. The key encrypting circuit 14 encrypts the data regarding the content key Kc with hidden key data. In other words, data regarding a device key Kd which is unique to the disc player and disc-drive device is supplied to an input terminal 15. Data regarding a medium key block Kb is supplied to an input terminal 16. An arithmetic circuit 17 calculates the data regarding the device key Kd and the data regarding the medium key block Kb and creates data regarding a medium key Km. The data regarding the medium key Km is supplied as a hidden key to the key encrypting circuit 14. The key encrypting circuit 14 encrypts the content key Kc with the medium key Km.

The key encrypting circuit 14 supplies the data regarding the content key Kc which has been encrypted with the medium key Km to a multiplexer 20. The data regarding the medium key block Kb which has been input from the input terminal 16 is supplied to the multiplexer 20. The multiplexer 20 multiplexes the data regarding the encrypted content key Kc supplied from the key encrypting circuit 14 and the data regarding the medium key block Kb supplied from the input terminal 16.

An output of the multiplexer 20 is supplied to the error correction code encoding circuit 19 through a switch circuit 21. The switch circuit 21 is turned on with an output of the area setting circuit 22 corresponding to the period for which the key information is recorded.

In other words, the area setting circuit 22 turns on the switch circuit 21 for periods corresponding to the record areas for the key information K1 and K2 in the lead-in area LI and the program area PA shown in FIG. 1A to FIG. 1C. In the periods corresponding to the record areas of the key information K1 and K2 in the lead-in area LI and the program area PA, when the switch circuit 21 is turned on in the lead-in area LI, the multiplexer 20 multiplexes the data regarding the encrypted content key Kc and the data regarding the medium key block Kb and supplies the multiplexed data to the error correction code encoding circuit 19 through the switch circuit 21.

In the period corresponding to the record area for the encrypted content data DA in the program area PA, the switch circuit 18 is turned on. When the switch circuit 18 is turned on in the program area PA, the encrypted content data which has been input from the content encrypting circuit 12 is supplied to the error correction code encoding circuit 19 through the switch circuit 18.

The error correction code encoding circuit 19 adds an error correction code to the multiplexed data supplied as record data from the multiplexer 20 or the encrypted content data supplied from the content encrypting circuit 12. Output data of the error correction code encoding circuit 19 is supplied to a modulating circuit 24. The modulating circuit 24 modulates output data of the error correction code encoding circuit 19. Output data of the modulating circuit 24 is supplied to an optical pickup 26 through a recording circuit 25.

The-optical pickup 26 radiates laser light as a light beam to the recording layer of the optical disc 1 and forms record tracks in concentric circle shape or spiral shape on the optical disc 1. The optical pickup 26 has an objective lens (not shown) which can be traveled in a focus direction and a tracking direction by an actuator (not shown). The objective lens focuses laser light on the recording layer of the optical disc 1.

The optical pickup 26 is traveled in a radial direction of the optical disc 1 by a thread mechanism (not shown). As a result, the optical pickup 26 can scan the optical disc 1 at least from the lead-in area to the lead-out area.

The optical disc 1 is rotated and driven at constant linear velocity (CLV) or constant angular velocity (CAV) by a spindle motor 29. The recording apparatus has a focus and tracking servo which controls laser light radiated from the optical pickup 26 in a focus direction and a tracking direction and a servo circuit 31 which rotates and drives the spindle motor 29 at constant linear velocity or constant angular velocity.

Laser light emitted from the optical pickup 26 is radiated to the optical disc 1. Corresponding to laser light emitted from the optical pickup 26, data is optically readably recorded on the optical disc 1.

As was described above, in the record periods for key information in the lead-in area LI and the program area PA, the switch circuit 21 is turned on. In the program area PA, the switch circuit 18 is turned on. Thus, as shown in FIG. 1A to FIG. 1C, the optical disc 1 on which the key information K1 and K2 have been recorded in the lead-in area LI and the program area PA, respectively and the content data DA encrypted with the key information K1 (same as the key information K2) has been recorded in the program area PA is formed.

The key information K1 and K2 are key information with which the content data DA has been encrypted. However, the hidden key and so forth which protect the key information may be varied.

Figure 4:
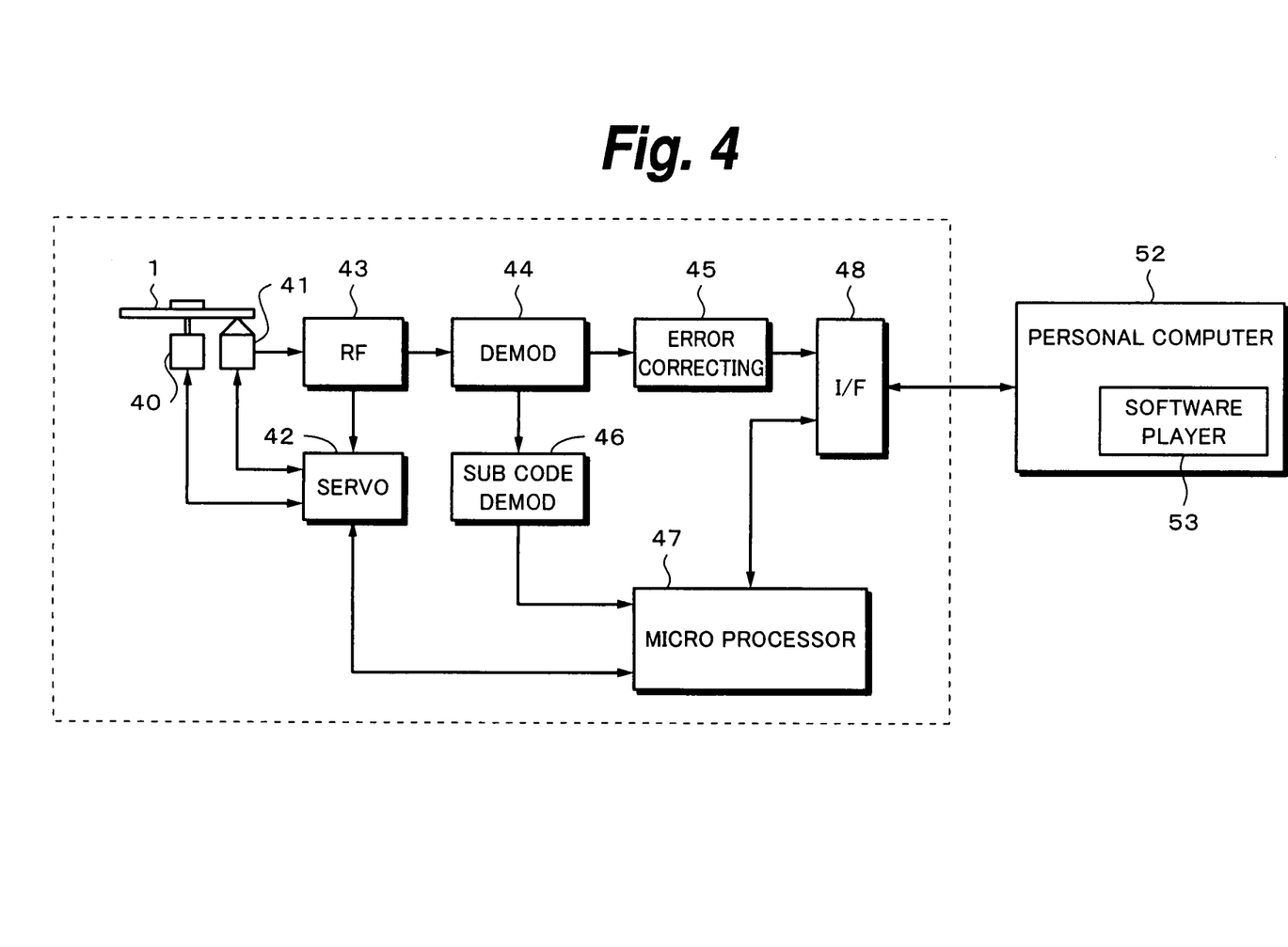
FIG. 4 is a block diagram showing an example of an optical disc reproducing apparatus according to the present invention.

FIG. 4 shows a structure of which a disc drive device 51 which cannot deal with the forgoing optical disc 1 decrypts encrypted content data recorded on the optical disc 1. In this example, the encrypted content data DA recorded in the program area PA of the optical disc 1 is decrypted using a software process of a personal computer 52.

In FIG. 4, the optical disc 1 is rotated and driven at constant linear velocity (CLV) or constant angular velocity (CAV) by a spindle motor 40. An optical pickup 41 is disposed corresponding to the optical disc 1. All the optical pickup 41 is traveled in a radial direction of the disc by a thread mechanism (not shown). As a result, the optical pickup 41 can scan the optical disc 1 from the lead-in area to the lead-out area. The disc drive device 51 has a focus and tracking servo which controls laser light emitted from the optical pickup 41 in a focus direction and a tracking direction and a servo circuit 42 which rotates and drives the spindle motor 40 at constant linear velocity or constant angular velocity.

Laser light emitted from the optical pickup 41 is focused on the optical disc 1 by an objective lens (not shown) disposed on the optical pickup 41. The laser light is reflected by a recording layer of the optical disc 1. The reflected light is detected by a photo detector disposed on the optical pickup 41. An output signal of the photo detector of the optical pickup 41 is supplied to a demodulating circuit 44 through an RF amplifier 43. The demodulating circuit 44 performs a demodulating process corresponding to the modulating process performed by the modulating circuit. 24. Output data of the demodulating circuit 44 is supplied to an error correcting circuit 45.

Output data of the demodulating circuit 44 is supplied to a sub code demodulating circuit 46. The sub code demodulating circuit 46 demodulates output data of the demodulating circuit 44 and outputs sub code data. The demodulated sub code data is supplied to a micro processor 47. Data is recorded as sectors each of which is composed of 98 frames on the optical disc 1. Each sector can be accessed corresponding to the sub code data.

The error correcting circuit 45 performs an error detecting and error correcting process corresponding to an error correction code contained in the output data of the demodulating circuit 44. Output data of the error correcting circuit 45 is supplied to the personal computer 52 through an interface 48.

A software player application 53 which is a demodulating process program which performs a decrypting process for encrypted data of the error correcting circuit 45 has been installed in the personal computer 52. The software player application 53 may be distributed with a recording medium such as a disc. Alternatively, the software player application 53 may be distributed to the user through a network such as the Internet. As shown in FIG. 1C, the software player application S1 may have been recorded in the program area PA of the optical disc 1 and may be read from the optical disc 1.

Figure 5:
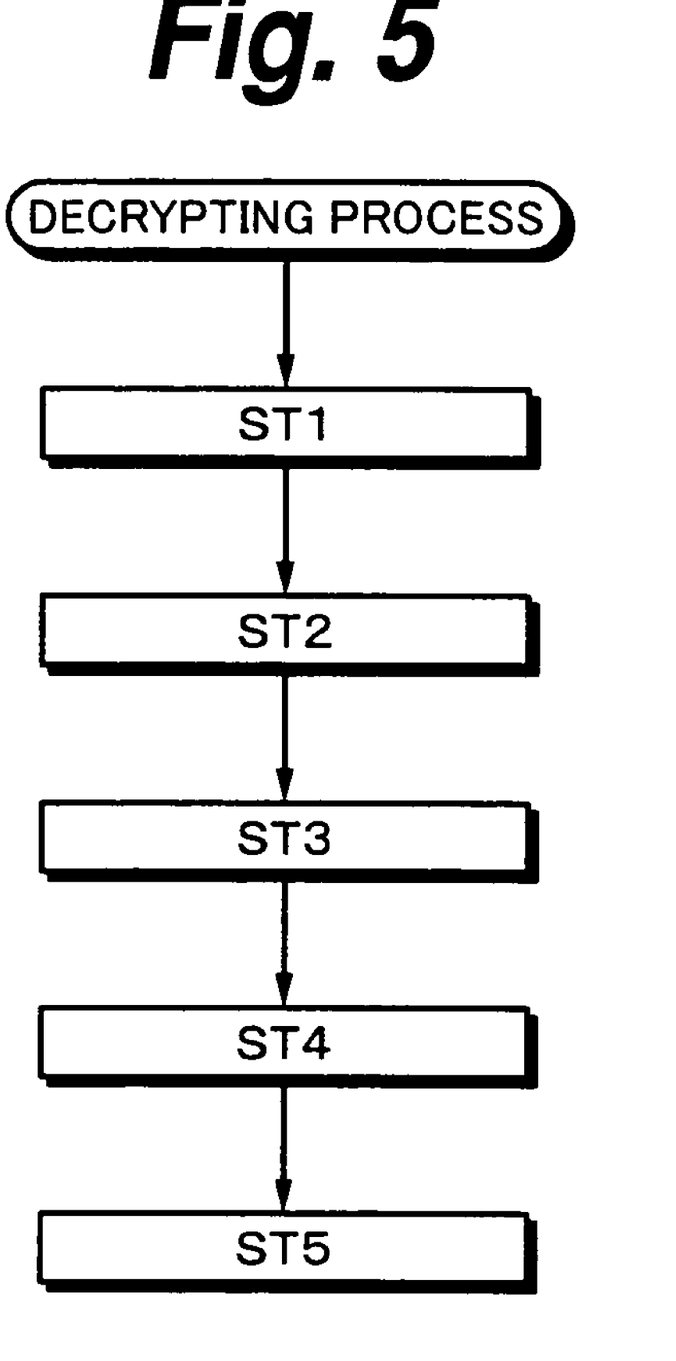
FIG. 5 is a flow chart for explaining an example of an optical disc reproducing apparatus according to the present invention.

FIG. 5 is a flow chart showing a decrypting process for encrypted content data DA in the program area PA. The decrypting process is performed as a process of the software player application 53

As shown in FIG. 5, when encrypted content data is reproduced from the optical disc 1, the software player application is started (at step ST1). When the software player application is started, the record position of the-key information K2 of the program area PA is judged corresponding to the application program. The key information K2 is read from the optical disc 1 to the personal computer 52 (at step ST2).

With the key information K2 which has been read, the content key data Kc for decrypting the content data DA is created (at step ST3).

In other words, at step ST3, the data regarding the encrypted content key Kc and the data regarding the medium key block Kb are separated from the key information K2 recorded in the program area PA. With a predetermined calculation for the data regarding the medium key block Kb and the data regarding the device key Kd, the data regarding the medium key Km is created. With the data regarding the medium key Km, the data regarding the content key Kc is decrypted.

The encrypted content data DA is read from the program area PA of the optical disc 1 to the personal computer 52 (at step ST4). With the data regarding the content key Kc created at step ST3, data reproduced from the program area PA is decrypted (at step ST5).

In the example, the decrypting process for the encrypted content data DA is processed by the software player application of the personal computer 52. Of course, the decrypting process for the encrypted content data DA may be performed by a program of the micro processor 47 of the disc drive device 51. When the program of the micro processor 47 of the disc drive device 51 is stored in a rewritable memory such as an EEPROM (Electrically Erasable Programming Read-Only Memory) or a flash memory, the program of the micro processor 47 of the disc drive device 51 can be changed from outside of the disc drive device 51. Of course, when the apparatus is shipped, such software may have been installed in the micro processor 47.

Figure 6:
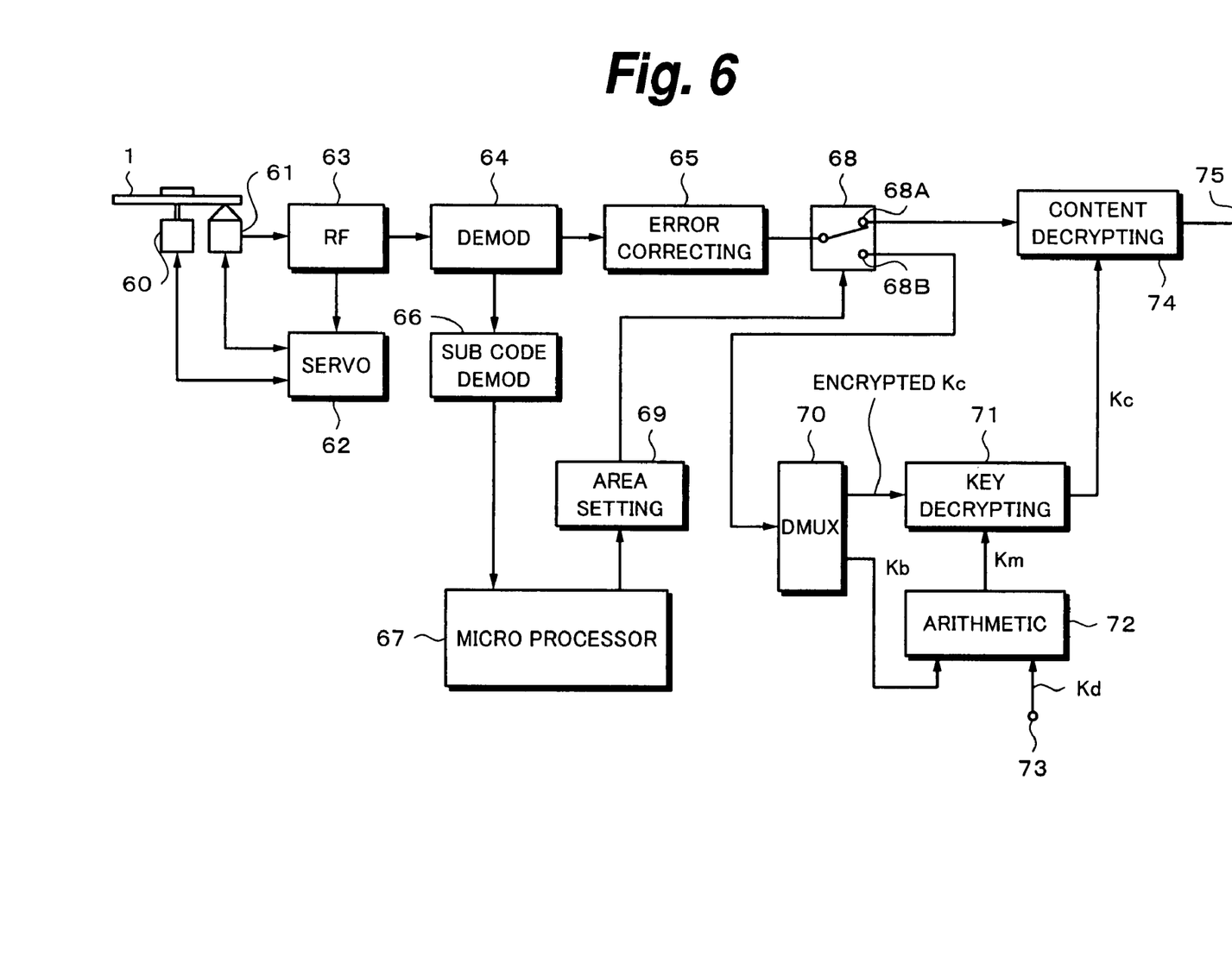
FIG. 6 is a block diagram showing another example of the optical disc reproducing apparatus according to the present invention.

FIG. 6 shows the structure of a reproducing apparatus which is the disc player and disc drive device which can deal with the forgoing optical disc 1 shown in FIG. 1A to 1C and which reproduce content data therefrom. As shown in FIG. 6, the disc player and disc drive device which can deal with the optical disc 1 provides a function for a decrypting process for encrypted content data as hardware or software.

In FIG. 6, the optical disc 1 is rotated and driven at constant linear velocity (CLV) or constant angular velocity (CAV) by a spindle motor 60. An optical pickup 61 is disposed corresponding to the optical disc 1. The optical pickup 61 is traveled in a radial direction of the optical disc 1 by a thread mechanism (not shown). As a result, the optical pickup 61 can scan the optical disc 1 from the lead-in area to the lead-out area. The reproducing apparatus has a focus and tracking servo which controls a beam emitted by the optical pickup 61 in a focus direction and a tracking direction and a servo circuit 62 which rotates and drives the spindle motor 60 at constant linear velocity or constant angular velocity.

Laser light emitted from the optical pickup 61 is focused on the optical disc 1 by an objective lens (not shown) disposed on the optical pickup 61. The laser light is reflected on a recording layer of the optical disc 1. The reflected light is detected by a photo detector (not shown) disposed on the optical pickup 61. An output signal of the photo detector of the optical pickup 61 is supplied to a demodulating circuit 64 through an RF amplifier 63. The demodulating circuit 64 performs a demodulating process corresponding to the modulating process of the forgoing modulating circuit 24. Output data of the demodulating circuit 64 is supplied to an error correcting circuit 65.

Output data of the demodulating circuit 64 is supplied to a sub code demodulating circuit 66. The sub code demodulating circuit 66 demodulates output data of the demodulating circuit 64 and outputs sub code data. The demodulated sub code data is supplied to a micro processor 67. On the optical disc 1, data is recorded as sectors which are blocks each of which is composed of 98 frames. Each sector can be accessed corresponding to sub code data.

The error correcting circuit 65 performs an error detecting and error correcting process with an error correction code contained in the output data of the demodulating circuit 64. An output of the error correcting circuit 65 is supplied to a switch circuit 68. The switch circuit 68 is controlled by an area setting circuit 69. The operation of the area setting circuit 69 is controlled by the micro processor 67.

In a record portion for the key information K1 of the lead-in area LI, the switch circuit 68 is placed on a contact 68B side. In a record portion for the content data DA of the program area PA, the switch circuit 68 is placed on a contact 68A side.

When encrypted content data recorded in the program area PA of the optical disc 1 is reproduced, the key information K1 of the lead-in area LI is unconditionally accessed. While the key information K1 of the lead-in area LI is being accessed, the switch circuit 68 is placed on the contact 68B side. As a result, the key information K1 reproduced from the lead-in area LI is supplied from the error correcting circuit 65 to a demultiplexer 70 through the switch circuit 68.

The demultiplexer 70 separates data regarding the content key Kc encrypted with the data regarding the medium key Km from the data regarding the medium key block Kb. The data regarding the encrypted content key Kc separated by the demultiplexer 70 is supplied to a key decrypting circuit 71. The data regarding the medium key block Kb is supplied to an arithmetic circuit 72. A device key Kd is supplied from an input terminal 73 to the arithmetic circuit 72.

The arithmetic circuit 72 performs a predetermined calculation with the data regarding the medium key block Kb and the data regarding the device key Kd and thereby creates the data regarding the medium key Km. The data regarding the medium key Km is supplied to the key decrypting circuit 71.

The key decrypting circuit 71 decrypts the data regarding the encrypted content key Kc with the data regarding the medium key Km and outputs the data regarding the content key Kc. The data regarding the content key Kc is supplied to a content decrypting circuit 74.

Thereafter, the program area PA of the optical disc 1 is accessed. As a result, the encrypted content data DA of the program area PA is reproduced. At that point, the switch circuit 68 is placed on the contact 68A side.

When the encrypted content data DA of the program area PA of the optical disc 1 has been reproduced and the switch circuit 68 has been placed on the contact 68A side, the encrypted content data DA is supplied from the error correcting circuit 65 to the content decrypting circuit 74 through the switch circuit 68. The data regarding the content key Kc is supplied from the key decrypting circuit 71 to the content decrypting-circuit 74.

The content decrypting circuit 74 decrypts the encrypted content data with the data regarding the content key Kc and outputs decrypted content data. The decrypted content data DA of the program area PA is output from an output terminal 75.

As was described above, in the optical disc 1 according to the present invention, the key information K1 and K2 have been recorded in the lead-in area LI and the program area PA, respectively. Thus, the reproducing apparatus which can deal with the optical disc 1 shown in FIG. 1A to FIG. 1C can unconditionally access the key information K1 of the lead-in area LI and decrypts the encrypted content data DA.

Figure 7A:
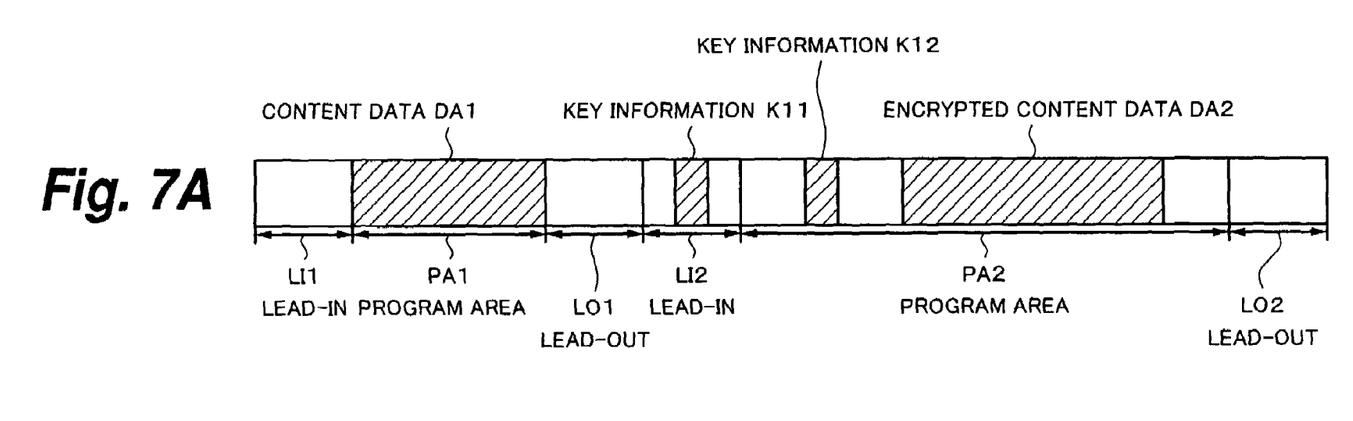
FIG. 7 is a schematic diagram for explaining another example of the optical disc according to the present invention.
Figure 7B:
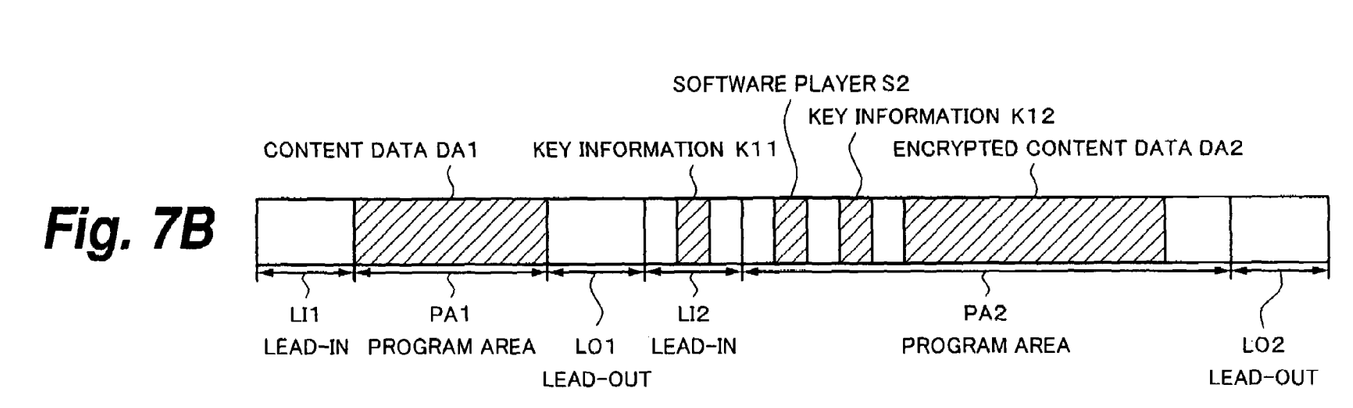

FIG. 7A and FIG. 7B show another embodiment of the present invention. In the example, data corresponding the conventional CD-DA format and encrypted content data have been separately recorded in two record areas. In the optical disc having the two record areas which are an inner circular record area and an outer circular record area. In the outer circular record area, content data corresponding to the CD-DA format has been recorded so that it can be easily reproduced by the conventional disc player. In the inner circular record area, encrypted content data has been recorded so that it can be congenial with a computer. In this example, content data recorded in the outer circular record area has been compressed corresponding to for example the ATRAC3 system. However, the compressing system is not limited to the ATRAC3 system.

In FIG. 7A and 7B, a first lead-in area LI1 is formed in the innermost circular record area of the optical disc. Outside the first lead-in area LI1, a first program area PA1 is formed. Outside the first program area PA1, a first lead-out area LO1 is formed. In the first program area PA1, audio content data DA1 has been recorded in the same record format as the CD-DA format. Since the audio content data DA1 of the first program area PA1 has the same record format as the CD-DA format and has not been encrypted, the audio content data DA1 can be reproduced by the conventional music reproduction disc player.

Outside the first lead-out area LO1, a second lead-in area LI2 is formed. Outside the second lead-in area LI2, a second program area PA2 is formed. Outside the second program area PA2, a second lead-out area LO2 is formed. Content data DA2 recorded in the second program area PA2 is audio data which has been compressed corresponding to the ATRAC3 system. The data DA2 in the second program area PA2 has been encrypted. Thus, to reproduce the data DA2 of the second program area, key information for decrypting the data DA2 is required.

Key information K11 for decrypting the content data DA2 of the second program area PA2 is recorded in the second lead-in area LI2. The key information K11 is protected with a hidden key so as to improve the security of the key information K11. To consider the case that the conventional disc drive decrypts encrypted content data, key information K12 which is the same as the key information K11 is recorded in the second program area PA2. To improve the security of the key information K12, the key information K11 is protected with a hidden key.

Alternatively, as shown in FIG. 7B, a software player application S2 which is a decrypting process program for decrypting the encrypted data DA2 recorded in the second program area PA2 may have been recorded in the second program area PA2.

As shown in FIG. 7A and FIG. 7B, when the disc of which the key information K11 and K12 have been recorded in the lead-in area LI2 and the program area PA2, respectively, is used, the disc player and disc drive device which can deal with the optical disc 1 can access the key information K12 of the lead-in area LI2, read the key information K12 therefrom, and decrypt the encrypted data DA2 of the program area PA2 with the key information K12. In contrast, the conventional disc player and disc drive device can access the key information K12 of the program area PA2, read the key information K12 therefrom, and decrypt the encrypted data DA2 of the program area PA2 using the software process.

In the forgoing example, although the key information K11 and K12 have been recorded in the lead-in area L12 and the program area PA2, respectively, the key information K11 and K12 may have been recorded in the lead-out area LO2 and the program area PA2, respectively. Alternatively, key information may have been recorded in the lead-in area LI2, the lead-out area L02, and the program area PA2.

Figure 8:
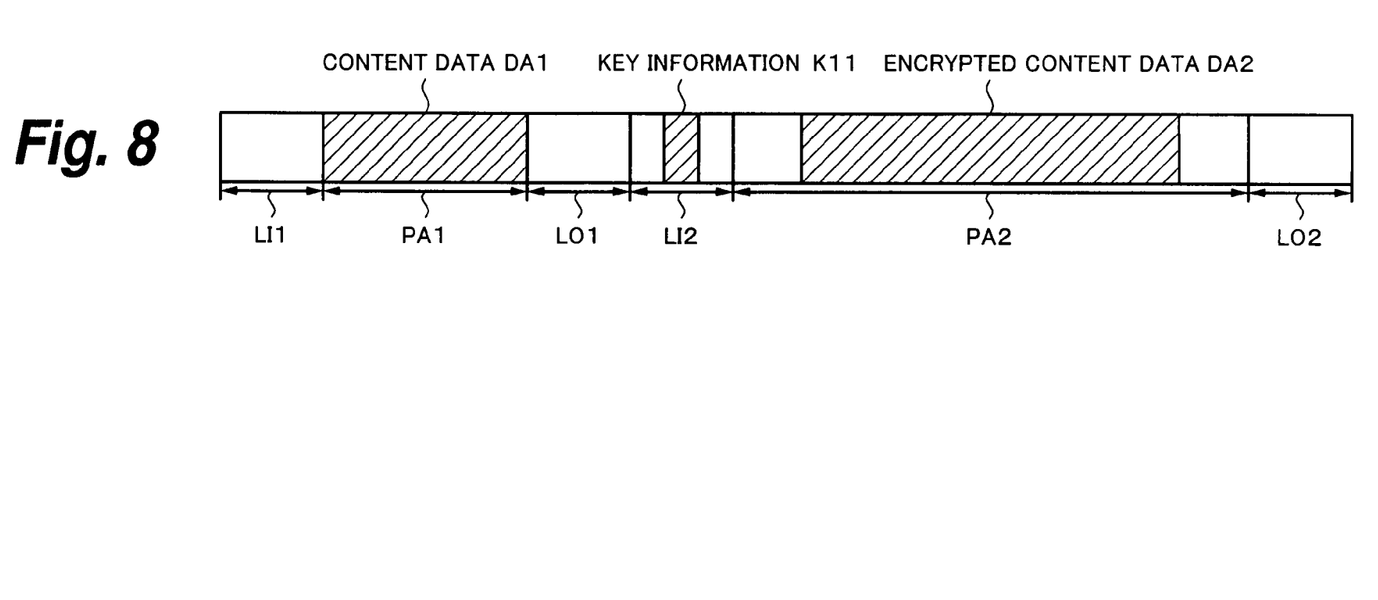
FIG. 8 is a schematic diagram for explaining another example of the new type optical disc.

When the disc player and disc drive device which can deal with the optical disc 1 shown in FIG. 1A to FIG. 1C will have become common, the key information K12 of the program area PA2 will be considered to be unnecessary. At that point, as shown in FIG. 8, the key information K11 may have been recorded in only the lead-in area LI2.

According to the present invention, encrypted content data has been recorded in a program area. Key information has been recorded in both a lead-in area and a program area.

The disc player and disc drive device which can deal with the new type optical disc have hardware or software for decrypting encrypted content data. Thus, the disc player and disc drive device can unconditionally access the lead-in area, obtain key information therefrom, and decrypt encrypted content data with the key information.

The conventional disc player and disc drive device can obtain key information from a program area and decrypt content data with the key information using software.

Thus, according to the present invention, any of the disc player and disc drive device which can deal with the new type optical disc and the conventional disc player and disc drive device can decrypt encrypted content data recorded in a program area. Especially, in a transitional period until the disc player and disc drive device which can deal with the optical disc 1 becomes common, the present invention is very useful.

Industrial Utilization

Thus, the present invention is suitable for the data recording medium, the data recording apparatus and method, and the data reproducing apparatus and method which allow content data to be secured with encryption.

The invention claimed is:

1. A recording medium recording apparatus, comprising:
   a head portion configured to scan a recording medium having at least a lead-in area, a program area, and a lead-out area;
   an encrypting circuit configured to encrypt content data with key information;

a signal processing circuit portion configured to perform a record signal process for output data of the encrypting circuit and supply the resultant processed signal to the head portion;

a controlling portion configured to record the encrypted content data to the program area of the recording medium and record same key information including an encrypted content key and a medium key block to the program area, and at least one of the lead-in area and the lead-out; and a key encrypting circuit portion configured to receive further key information and to encrypt the key information with the further key information, the key encrypting circuit portion including, an arithmetic circuit portion configured to create the further key information with at least first key data and second key data which is unique to a recording and/or reproducing apparatus for the recording medium, and a multiplexing circuit portion configured to multiplex the first key data and the encrypted key information.

2. The recording medium recording apparatus as set forth in claim 1, wherein the controlling portion has:

a selecting circuit configured to selectively supply output data of the encrypting circuit portion and output data of the key encrypting circuit to the signal processing circuit portion.

3. The recording medium recording apparatus as set forth in claim 2, wherein the controlling portion has:

a setting portion configured to cause the selecting circuit portion to supply output data of the key encrypting circuit portion to the signal processing portion when the key information is recorded by the head portion and to supply output data of the encrypting circuit portion to the signal processing portion when encrypted content data is recorded to the program area by the head portion.

4. The recording medium recording apparatus as set forth in claim 1, wherein the key encrypting circuit portion has:

a creating portion configured to create the further key information with at least key data unique to a recording and/or reproducing apparatus for the recording medium.

5. The recording medium recording apparatus as set forth in claim 1, wherein the controlling portion is configured to record process data for decrypting encrypted content data recorded in the program area to the program area.

6. A recording medium reproducing method, comprising:

providing a recording medium having at least a lead-in area, a program area configured record encrypted content data, and a lead-out area;

starting a reproducing operation corresponding to program data for reproducing the encrypted content data recorded in the program area of the recording medium, same key information including an encrypted content key and a medium key block for decrypting the encrypted content data being recorded in the program area, and at least one of the lead-in area and the lead-out area;

reading the key information recorded in the program area;

reading the encrypted content data recorded in the program area; and decrypting the encrypted content data which has been read with the key information which has been read, wherein key data for decrypting the encrypted content data is created with the key information which has been read, key data for decrypting the encrypted content data is created with the key information which has been read with first key data and second key data which is unique to an apparatus which can reproduce data of at least the recording medium, and the first key data has been multiplexed with the key information and recorded in the program area of the recording medium.

7. The recording medium reproducing method as set forth in claim 6, wherein a record location of the key information in the program area is obtained corresponding to the program data.

8. The recording medium reproducing method as set forth in claim 6, wherein key data for decrypting the encrypted content data is created with the key information which has been read with at least key data unique to an apparatus which can reproduce data of at least the recording medium.

9. The recording medium reproducing method as set forth in claim 6, wherein the program data has been recorded in the program area, and wherein when content data is reproduced from the recording medium, the program data is read from the program area.

10. A recording medium reproducing method, comprising:

providing at least a lead-in area, a program area configured to record encrypted content data, and a lead-out area;

reading key information for decrypting the encrypted content data from the lead-in area, same key information including an encrypted content key and a medium key block having been recorded in the program area, and at least one of the lead-in area and the lead-out area; and decrypting the encrypted content data which has been read from the program area with the key information which has been read, wherein key data for decrypting the encrypted content data is created with the key information which has been read, the key data for decrypting the encrypted content data is created with the key information which has been read with first key data and second key data which is unique to an apparatus which can reproduce data of at least the recording medium, and the first key data has been multiplexed with the key information and recorded in the program area of the recording medium.

11. The recording medium reproducing method as set forth in claim 10, wherein the key data for decrypting the encrypted content data is created with at least key data unique to an apparatus which can reproduce data of at least the recording medium.

12. A recording medium reproducing apparatus, comprising:

a recording medium having at least a lead-in area, a program area configured to record encrypted content data, and a lead-out area;

a head portion configured to scan the recording medium, same key information including an encrypted content key and a medium key block for decrypting the encrypted content data having been recorded in the program area, and at least one of the lead-in area and the lead-out area;

a signal processing circuit portion configured to perform a reproduction signal process for data which has been read from the head portion;

a decrypting circuit portion configured to decrypt the encrypted content data which has been read from the program area with the key information which has been read from the recording medium, and a key decrypting circuit portion configured to decrypt key information which has been read from the recording medium and to supply the decrypted key information to the decrypting circuit portion, the key decrypting circuit including, an arithmetic circuit portion configured to create key data for decrypting the encrypted content data with the key information which has been read with first key data and second key data which is unique to the reproducing apparatus, and a decrypting circuit portion configured to demultiplex multiplexed data of the key information and the first key, wherein the first key data has been multiplexed with the key information and recorded in the program area of the recording medium.

13. The recording medium reproducing apparatus as set forth in claim 12, further comprising:

a selecting portion configured to selectively supply output data of the signal processing circuit portion to the decrypting circuit portion and the key decrypting circuit portion; and a setting portion configured to create the selecting portion to supply output data of the signal processing circuit portion corresponding to the encrypted content data which has been read from the recording medium to the decrypting circuit portion and output data of the signal processing circuit portion corresponding to the key information which has been read from the recording medium to the key decrypting circuit portion.

14. The recording medium reproducing apparatus as set forth in claim 12, wherein the key decrypting circuit portion has:

a creating portion configured to create key data for decrypting the encrypted content data with the key information which has been read with at least key data unique to the reproducing apparatus.

* * * * *

UNITED STATES PATENT AND TRADEMARK OFFICE
CERTIFICATE OF CORRECTION

PATENT NO. : 7,142,494 B2
APPLICATION NO. : 10/250307
DATED : November 28, 2006
INVENTOR(S) : Yoichiro Sako et al.

It is certified that error appears in the above-identified patent and that said Letters Patent is hereby corrected as shown below:

Column 2, line 44, change "along-with" to --along with--.

Column 11, line 8, change "decrypting-circuit" to --decrypting circuit--.

Column 13, line 52, Claim 6 insert --to-- after "configured."

Signed and Sealed this

Twenty-fourth Day of April, 2007

JON W. DUDAS
*Director of the United States Patent and Trademark Office*